United States Patent
Bonzi et al.

(10) Patent No.: US 11,157,950 B2
(45) Date of Patent: Oct. 26, 2021

(54) ATTRIBUTION OF RESPONSES TO ADVERTISING

(71) Applicant: 2KDirect, LLC, San Luis Obispo, CA (US)

(72) Inventors: Joe Bonzi, San Luis Obispo, CA (US); Shane Thomas, San Luis Obispo, CA (US)

(73) Assignee: 2KDirect, Inc., San Luis Obispo, CA (US)

( * ) Notice: Subject to any disclaimer, the term of this patent is extended or adjusted under 35 U.S.C. 154(b) by 1018 days.

(21) Appl. No.: 14/274,400

(22) Filed: May 9, 2014

(65) Prior Publication Data

US 2015/0324847 A1 Nov. 12, 2015

(51) Int. Cl.
*G06Q 30/00* (2012.01)
*G06Q 30/02* (2012.01)

(52) U.S. Cl.
CPC ..... *G06Q 30/0247* (2013.01); *G06Q 30/0242* (2013.01); *G06Q 30/0256* (2013.01); *G06Q 30/0272* (2013.01); *G06Q 30/0273* (2013.01); *G06Q 30/0277* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 2012/0029986 | A1* | 2/2012 | Jalili | G06Q 30/0211 705/14.13 |
| 2012/0089459 | A1* | 4/2012 | Ramaswamy | G06Q 30/02 705/14.49 |
| 2014/0201126 | A1* | 7/2014 | Zadeh | A61B 5/165 706/52 |
| 2015/0317678 | A1* | 11/2015 | Huang | G06Q 30/0256 705/14.54 |
| 2017/0098249 | A1* | 4/2017 | Eidelson | G06Q 30/0271 |
| 2017/0140432 | A1* | 5/2017 | Lin | G06Q 30/0261 |

* cited by examiner

*Primary Examiner* — Alvin L Brown
(74) *Attorney, Agent, or Firm* — Perkins Coie LLP

(57) ABSTRACT

A facility for analyzing electronic advertising is described. The facility determines that a particular client device has been used to activate a first advertising message for a particular cause. In response, the facility identifies a second advertising message for that cause that was presented on the same client device at a time before the first advertising message was activated. In response, the facility determines that the activation of the first advertising message is at least partly attributable to the presentation of the second advertising message.

28 Claims, 10 Drawing Sheets display advertising campaign table — 300

| campaign identifier | advertiser | creative URL | landing page URL |
|---|---|---|---|
| 116342 | Dodge | adserve.com/caravan6.jpg | dodge.com/caravan |
| 123128 | Dodge | adserve.com/challenge.jpg | dodge.com/challenger |
| 149132 | Dodge | adserve.com/caravan8.jpg | dodge.com/caravan |
| ... | | | |

*FIG. 3A*

| advertiser | search advertising message text | ultimate landing page |
|---|---|---|
| Dodge | Check out the new 2015 Dodge Caravan! | dodge.com/caravan |
| Dodge | Dodge Challenger is fierce! | dodge.com/challenger |
| ... | | | search advertising table — 350
351
352
361
362
363

*FIG. 3B*

| attribution client identifier | landing page | campaign id | display ad presentation date/time | search ad clickthrough date/time |
|---|---|---|---|---|
| 56972314 | dodge.com/caravan | 116342 | 02Feb2014:11:32:13 | 02Feb2014:13:16:32 |
| ... | | | | |

*FIG. 7*

ATTRIBUTION OF RESPONSES TO ADVERTISING

TECHNICAL FIELD

The described technology is directed to the field of electronic advertising.

BACKGROUND

Advertising on the web typically involves the presentation of visual information—such as text and/or images promoting a cause such as a product or service—as part of a web page displayed by a browser. Such visual information is often called an advertising message.

One type of web advertising message is a search advertising message. A search advertising message is displayed within a search result page generated by a search engine to include links to other web pages that satisfy a search query inputted by a user. For example, in response to receiving the search query "minivan," a search engine would typically generate a search result page containing links to other web pages that are related to this query, such as web pages of auto manufacturer websites showing and describing minivans sold by those manufacturers, pages of auto rating websites rating different brands of minivans, pages containing government crash testing results and recall notices for different minivans, etc.

The search advertising messages shown on a search results page are typically related to the query for which the search result page was generated. In particular, as part of purchasing presentation of a search advertising message, the advertiser or its representative typically specifies one or more words or phrases to which the search advertising message relates. The search advertising message is then eligible for inclusion in the search result page generated for any query containing any of those words or phrases. For example, the manufacturer of a particular minivan may purchase presentation of a search advertising message about the manufacturer's minivan that, when clicked on by the user, causes the display of a page of the manufacturer's web site showing and describing the manufacturer's minivan. The web page reached by clicking on the search advertising message is known as the "target page," "click target," and/or "landing page" of the search advertising message. As part of purchasing the presentation of this search advertising message, the manufacturer may specify the word "minivan," and the phrase "small van." As a result, this search advertising message is eligible to be included in any search result page generated for a query containing the word "minivan" or the phrase "small van."

The advertiser who purchases presentation of such a search advertising message does so with an intention to induce users to visit particular web pages. Accordingly, many advertisers seek to measure, among presentations of a search advertising message to different users, those that result in the user clicking through to the search advertising message's landing page.

In general, the benefit of these "click-through" events is attributed to the particular formulation of the search advertising message, and the cost paid by the manufacturer to the operator of the search engine to present it.

BRIEF DESCRIPTION OF THE DRAWINGS

FIG. 3A is a table diagram showing sample contents of a display advertising table.

FIG. 3B is table diagram showing sample contents of a search advertising table used by the facility in some embodiments.

FIG. 7 is a table diagram showing in it sample contents of an attribution table used by the facility in some embodiments to store information about the attribution of search advertising message click-throughs to display advertising messages and advertising messages of other types for the same cause previously presented to the same user.

DETAILED DESCRIPTION

Figure 1:
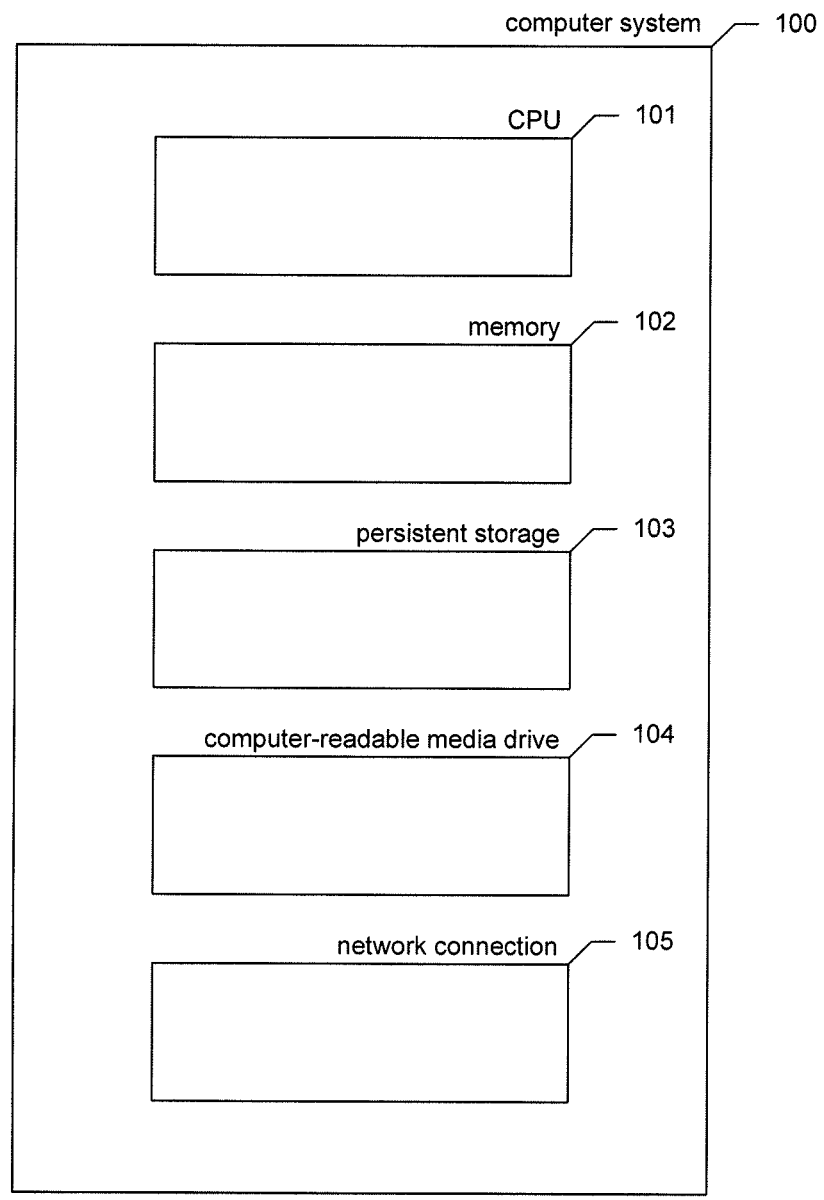
FIG. 1 is a block diagram showing some of the components typically incorporated in at least some of the computer systems and other devices on which the facility operates.

In some cases, in order to further promote visits to a particular target page, in addition to purchasing the presentation of one or more search advertising messages whose landing page is this target page, the advertiser also purchases the presentation of advertising messages of one or more other types whose landing page is also the target page. One example is display advertising messages, which are included in served instances of arbitrary web pages using one or more user targeting techniques. These techniques can include, for example, including the display advertising message in a particular instance of a particular page on the basis of (1) the subject of the page, the website containing the page, or a section of the website to which the page belongs; (2) demographic information known about the user, such as sex, age, income, geographic location, etc.; (3) behavior of the user, such as web browsing behavior, other information-consumption behavior such as television or movie watching, ebook reading, music listening, etc., or real-world behavior such as making a property tax payment, competing in a bicycle race, etc.; and/or (4) time of day, day of week, etc.

The inventors have recognized that a correlation that often exists between users who, when presented with a search advertising message for a landing page, click through to the landing page, and users to whom a display advertising message for the same cause has previously been presented.

Accordingly, the inventors seek to measure the impact of prior presentations of display advertising messages, or advertising messages of different types, on click-through events performed by the same users with respect to search advertising messages for the same cause. They have therefore developed a software and/or hardware facility that establishes attributions between click-through events each performed by a user with respect to a search advertising message for a cause and earlier presentations of advertising messages—such as display advertising messages—for the same cause to the same users ("the facility").

When a display advertising message is served to a user, the facility stores for the user an indication of two pieces of information: a campaign identifier identifying the advertising message, and a landing page URL reflecting the web page to which the user would be navigated if the user clicked on the display advertising message. In some embodiments, a date and time at which the display advertising message is served is also stored. In various embodiments, the facility stores these pieces of information directly in a browser cookie for a selected domain as part of serving the display advertising message, or in a server-side database record connected with the user based on a user ID stored both in the database record and a browser cookie. In various embodiments, the facility uses various other mechanisms for storing information on the client on behalf of a particular domain in place of cookies.

When a search advertising message is served, the facility specifies its landing page as follows: an attribution URL in the domain of the cookie that includes a field specifying the URL of the ultimate landing page for the search advertising message. Because the attribution URL is in the domain of the cookie, the contents of the cookie are passed up from the client with the HTTP request for the attribution URL. When the server receives the HTTP request for the attribution page of the URL, the server determines whether the search advertising message ultimate landing page URL matches any of the display advertising message landing page URLs recorded for the user. If so, the server stores an attribution of the search advertising message click-through to the matching display advertising message that includes the campaign identifier of the display advertising message. Either way, the server redirects the HTTP request to the search advertising message ultimate landing page URL.

By performing in some or all of the ways described above, the facility enables an advertiser and/or the advertiser's representative to discern the effect of display advertising and/or other types of advertising on search advertising message click-through behavior.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
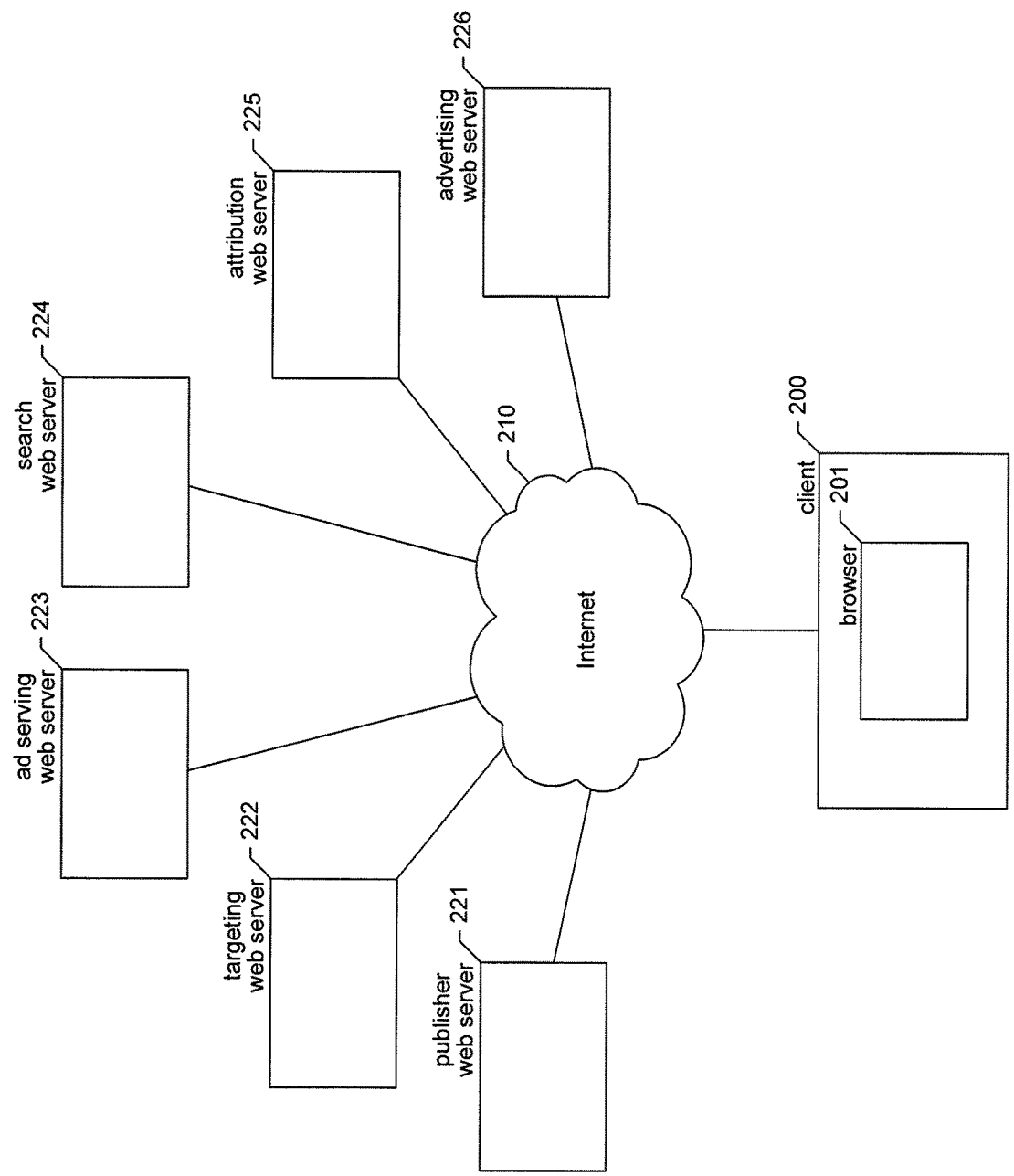
FIG. 2 is a network diagram showing some computer systems involved in the facility's operation in some embodiments.

FIG. 2 is a network diagram showing some computer systems involved in the facility's operation in some embodiments. These include a client computer system 200 used by user. In particular, the user executes a browser program 201 in order to display the contents of web pages and follow links within them to other web pages. The client is connected to a number of remote server computer systems via a network such as the Internet 210. These server computer systems include a publisher web server 221 that serves web pages on which display advertising is sold; a targeting web server 222 that selects a display advertising message for incorporation into a particular served instance of a publisher web page; an advertising message serving web server 223 that serves the selected display advertising message for display within the publisher web page by the browser; a search web server 224 that serves web pages for a search service, one type of which solicits a query string from the user, and another type of which contains the search result for that query, along with associated search advertising messages; an attribution web server 225 that registers the click-through of a search advertising message by a user and identifies any display advertising messages previously presented to the user having the same landing page and/or for the same cause; and an advertiser web server 226 that serves the ultimate landing page for the search advertising message.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

FIGS. 3A and 3B show information about example display and search advertising messages used by a particular advertiser to promote particular landing pages.

FIG. 3A is a table diagram showing sample contents of a display advertising table. The display advertising table 300 is made up of rows, such as rows 301, 302, and 303, each corresponding to a different display advertisement placement. Each row is divided into the following columns: a campaign identifier column 311 whose contents identify a campaign corresponding to a particular combination of a landing page and a display advertising message, or "creative" for that page for an advertiser; an advertiser column 312 identifying the advertiser for the campaign; a creative URL 313 identifying a URL useable to retrieve the display advertising message for the campaign; and a landing page URL column 314 containing a URL useable to retrieve the landing page to which a user is to be directed if they click on the display advertising message. For example, row 301 indicates that a campaign having campaign identifier 116342 for the advertiser Dodge has the creative URL adserve.com/caravan6.jpg in the landing page URL dodge.com/caravan.

While FIG. 3A and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown; etc.

FIG. 3B is table diagram showing sample contents of a search advertising table used by the facility in some embodiments. The search advertising table 350 is made up of rows such as rows 351 and 352 each corresponding to a search advertising placement. Each row is divided into the following columns: an advertiser column 361 identifying the advertiser associated with the placement; a search advertising message text column 362 containing the text to be displayed in the search advertising message; and an ultimate landing page column 363 containing a URL to which a user should ultimately be directed after clicking on the search advertising message. For example, row 351 indicates that the placement for the advertiser Dodge has the search advertising message text "Check out the new 2015 Dodge Caravan!," and the ultimate landing page dodge.com/caravan.

Figure 4:
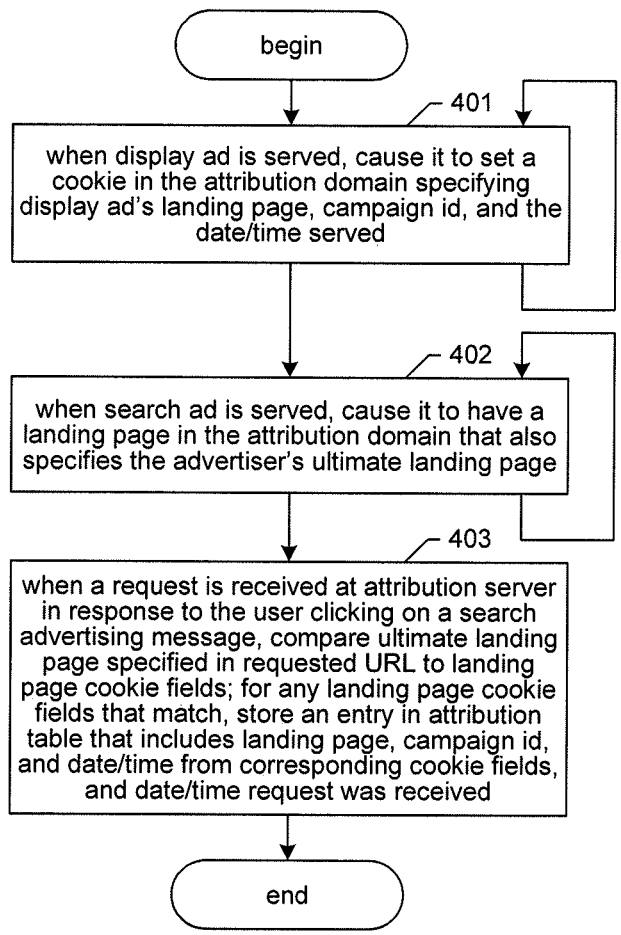
FIG. 4 is a flow diagram showing steps to be performed by the facility in some embodiments in order to attribute search advertising click-throughs to display advertisements for the same cause earlier presented to the same user.

FIG. 4 is a flow diagram showing steps to be performed by the facility in some embodiments in order to attribute search advertising click-throughs to display advertisements for the same cause earlier presented to the same user. In step 401, when the display advertising message is served, the facility causes it to set a cookie in the attribution domain specifying the following information: the display advertising message's landing page, the display advertising message's campaign identifier, and the date and time on which the display advertising message is served. The facility's performance of step 401 is described further below in connection with FIGS. 5A-5B.

Figure 5A:
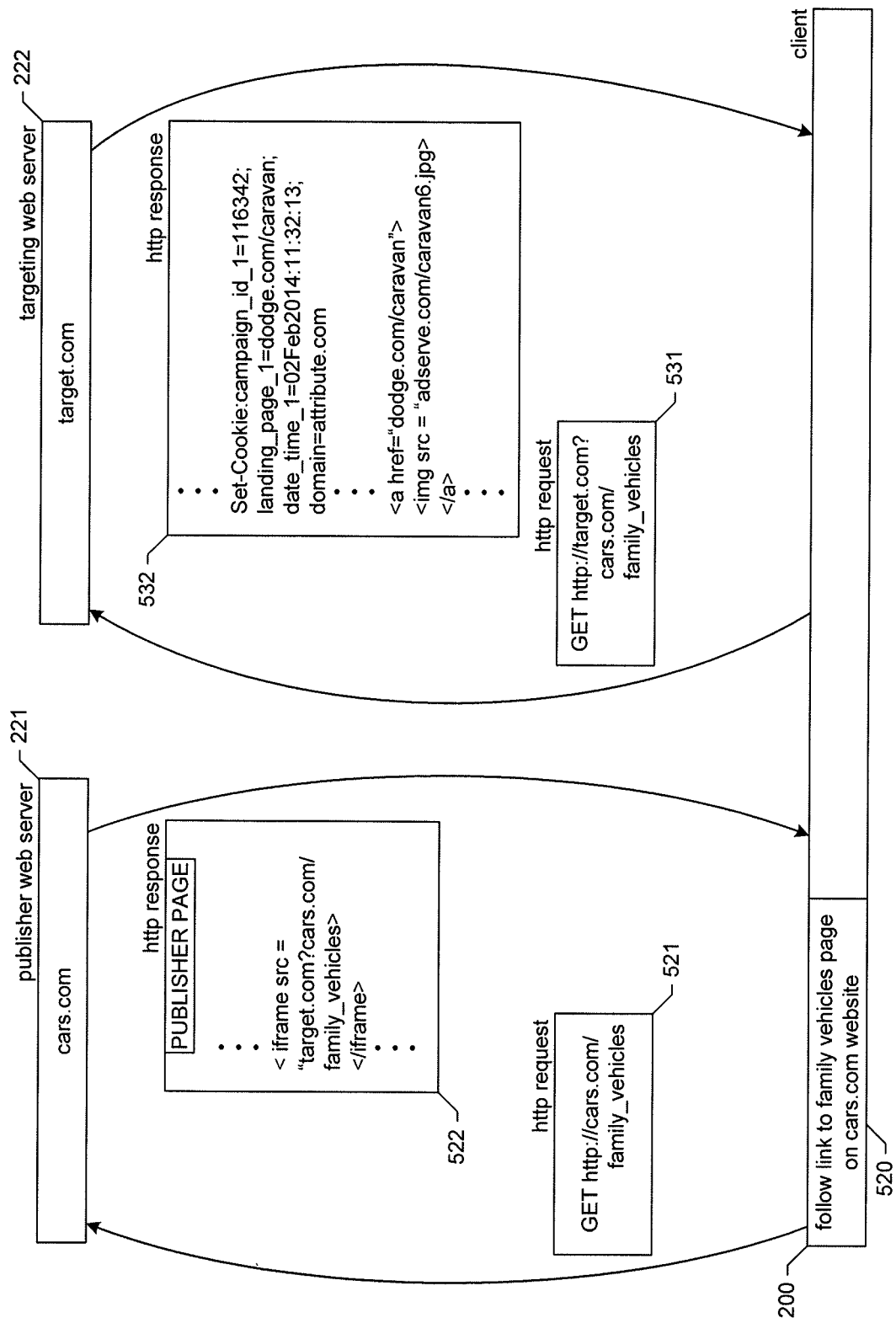
FIG. 5A is a data flow diagram showing data exchanged in accordance with the facility as part of presenting a display advertising message in some embodiments.
Figure 5B:
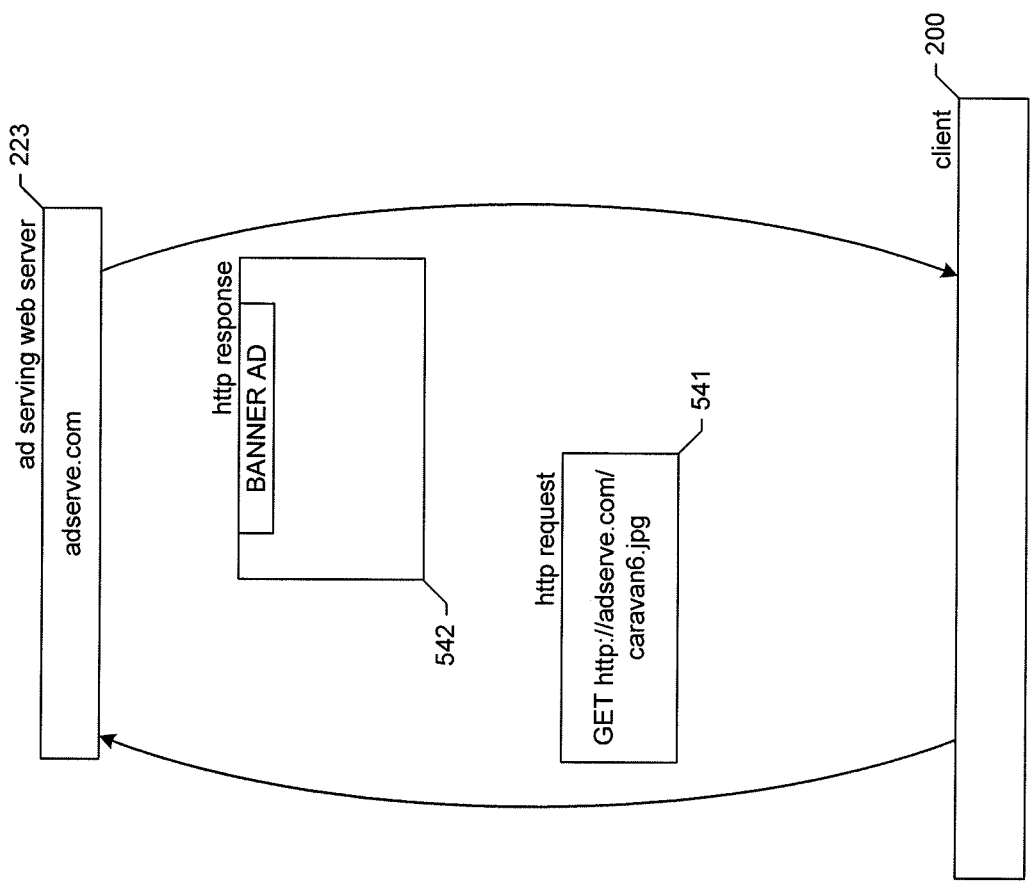
FIG. 5B is a data flow diagram showing data exchanged in accordance with the facility as part of presenting a display advertising message in some embodiments.

FIG. 5A-5B are data flow diagrams showing data exchanged in accordance with the facility as part of presenting a display advertising message in some embodiments. Beginning in FIG. 5A, a user performs an action 520 to follow a link to a family vehicles page of a web site operated by the publisher cars.com. In various embodiments, the user can perform a variety of other actions in order to navigate to this web page. In response to this action, the client transmits an http request 521 to the publisher web server 221 for cars.com. The http request contains a GET command for the sought web page. The publisher web server responds with an http response 522 containing the requested web page. The page in the http response contains an inclusion reference that will cause the browser on the client to make a request of a targeting web server to select a display advertising message to be presented within the publisher page when displayed by the browser on the client. In particular, the shown display advertising message is the one specified in row 301 of FIG. 3A.

The client accordingly sends an http request 531 to a targeting web server for the domain target.com. The http request contains a GET command for retrieving a page specifying a display advertising message to be included in the publisher page returned in http response 522. The http request 531 includes information to be used in the targeting, here the identity of the publisher page. In a variety of embodiments, a variety of information from a variety of sources can be used by the targeting web server to select a display advertising message, including information from a variety of sources, both received as part of the http request and/or received via different channels. In response, the targeting web server transmits to the client an http response 532. The response includes a link to the landing page for the selected display advertisement, associated with an image tag for the content of the display advertisement. The http response 532 further includes a set cookie command that instructs the browser and the client to store the campaign ID, landing page, and current date and time in a client-side cookie that is assigned to the domain of the attribution server, "attribute.com." Upon receiving this response, the browser on the client stores a cookie in accordance with the set-cookie command, and adds the tags for the display advertising message image in the associated link to the publisher page perceived in http response 522.

Proceeding to FIG. 5B, in order to render these additional tags inside the publisher page, the client sends an http request 541 to the advertising message serving web server 223 in the adserve.com domain. Http request 541 contains a GET command for the display advertising message image specified for the selected display advertising message in http response 532. The advertising message serving web server responds to http request 541 with http response 542 containing the display advertising message content. When the client receives http response 542, it displays the contained image within the publisher webpage, such that if it is clicked on by the user, the browser navigates to the landing page specified in http response 532.

Returning to FIG. 4, step 401 is repeated for any additional presentations of display advertising to the user. In step 402, when a search advertising message is served to the user, the facility causes it to have a landing page in the attribution domain (the domain of the attribution server) that specifies the advertiser's ultimate landing page for the search advertising message. The performance of step 402 is discussed further below in connection with FIGS. 6A-6B.

Figure 6A:
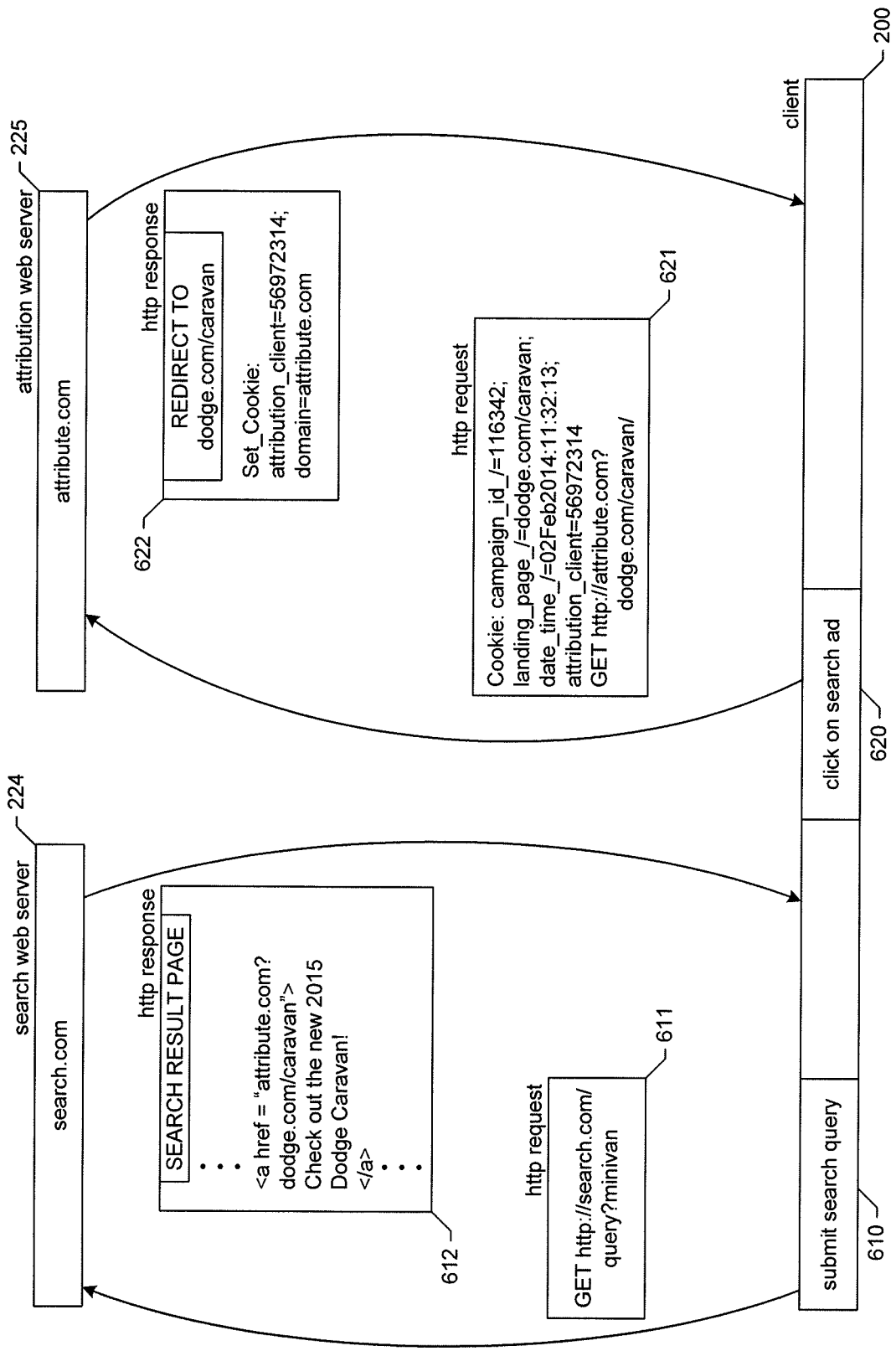
FIG. 6A is a data flow diagram that shows a typical exchange of data performed in accordance with a facility in connection with the presentation of a search advertising message.
Figure 6B:
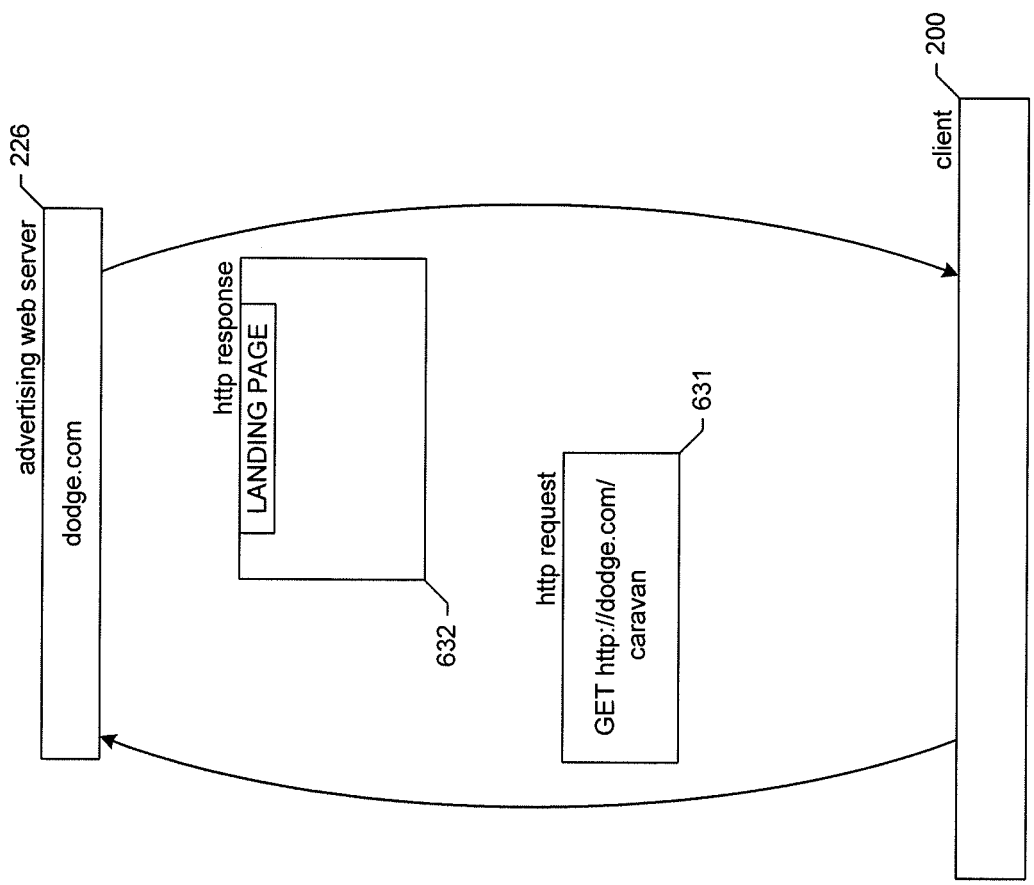
FIG. 6B is a data flow diagram that shows a typical exchange of data performed in accordance with a facility in connection with the presentation of a search advertising message.

FIGS. 6A-6B are data flow diagrams that show a typical exchange of data performed in accordance with a facility in connection with the presentation of a search advertising message.

Beginning in FIG. 6A, the user of the client 200 performs an action with the browser to submit a search query to a search engine, such as typing the query into a query field on a query page served by the search engine. In response, the browser on the client sends an http request 611 to the search web server 224 in the domain search.com. This http request contains a GET command that specifies a page in the web server domain whose URL contains the query string specified by the user, here "minivan". In response, the search web server sends an http response 612 to the client. Http response 612 constitutes a search result page that includes links to other web pages that satisfy the query specified by the user. The search result page also contains, as shown, at least one search advertising message. The shown search advertising message is the one specified in row 351 of FIG. 3B. In particular, the search advertising message has the displayed text "Check out the new 2015 Dodge Caravan!." The landing page specified for the search advertising message is in the attribution domain and includes the ultimate landing page URL specified in row 351, "dodge.com/caravan." When the client receives http response 612, it renders the search result page, including the sample search advertising message.

When the user takes the action 620 of clicking on the sample search advertising message, the client sends an http request 621 to the attribution web server 225 for the attribute.com domain. Http request 621 contains a GET command for the landing page URL specified for the search advertising message, which includes the ultimate landing page for the search advertising message. Http request 621 also contains a Cookie directive that passes the name and value of every cookie stored on the client for the attribute.com domain. In general, these will include, for at least some of the display advertising messages recently presented to the user or others of the client, the display advertising message's campaign ID, landing page, and date and time of the presentation. As shown, http request 621 also includes the name and value of an attribution_client cookie stored on the client by an earlier instance of http response 622. If no such attribution_client cookie has previously been set, none will be present in http request 621. Upon receiving http request 621, the attribution web server performs processing to determine and record attribution for the search advertising message, which will be described below in connection with step 403. The targeting web server also sends to the client an http response 622 redirecting the client browser to the ultimate landing page for the search advertising message, "dodge.com/caravan." Http response 622 also contains a set cookie directive for setting an attribution_client cookie on the client for the domain attribute.com. Where a value for this cookie was included in http request 621, the same value is included in http response 622. Where no value was included in http request 621, the attribution web server selects an attribution_client value not previously assigned to another client for inclusion in http response 622. When the client receives http response 622, it stores an attribution_client cookie in accordance with the set-cookie directive.

Turning to FIG. 6B, the client also sends an http request 631 to the advertiser web server 226 in the dodge.com domain. The http request 631 includes a GET command for the ultimate landing page for the search advertising message. The advertiser web server 226 sends the client 200 an http response 632 containing the landing page, which the browser renders upon receiving the client.

Returning to FIG. 4, step 402 is repeated for any additional search advertising messages that are served to the user. In step 403, when a request is received at the attribution server in response to the user clicking on a search advertising message presented to the user, the facility compares the ultimate landing page specified in the requested URL to landing page cookie fields included in the request. For any landing page cookie fields that match the ultimate landing page of the search advertising message, the facility stores an entry in an attribution table that includes the landing page, campaign identifier, and date and time from cookie fields corresponding to the matching landing page cookie fields, as well as the date and time the request was received by the attribution server. The facility's performance of step 403 is discussed further below in connection with FIG. 7. After step 403, these steps conclude, and/or continue to process additional display advertising message presentations, search advertising message presentations, and search advertising message click-throughs.

Those skilled in the art will appreciate that the steps shown in FIG. 4 may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

FIG. 7 is a table diagram showing in it sample contents of an attribution table used by the facility in some embodiments to store information about the attribution of search advertising message click-throughs to display advertising messages and advertising messages of other types for the same cause previously presented to the same user. The attribution table 700 is made of rows including row 701 each identifying one combination of a search advertising click-through for a cause and an advertising message for the same cause earlier presented to the same user. Where a search advertising message click-through for a cause was preceded by the presentation of multiple advertising messages of different types for the same cause, in some embodiments the facility includes separate rows in the attribution table for each combination of the search advertising message click-through and a different presentation of an advertising message of a different type. Each row is divided into the following columns: an attribution client identifier column 711 identifying the client computer system, and, accordingly, roughly identifying the user of the client computer system, on which the click-through was performed; a landing page column 712 containing the URL identifying the landing page both of the search advertising message and of the advertising message of the other type, e.g., display advertising message; a campaign identifier column 713 containing a value identifying the particular display advertising message that was earlier presented to the user; a display advertising message presentation date and time column 714 indicating the date and time at which the advertising message of another type was presented to the user; and a search advertising message click-through date and time column 715 indicating the date and time at which the user clicked through the advertising message. For example, row 701 indicates that, at 1:16:32 pm on Feb. 2, 2014, a user on the client having attribution client identifier 56972314 clicked through a search advertising message having the ultimate landing page dodge.com/caravan, having earlier been presented with the display advertising message having campaign ID on 116342 on Feb. 2, 2014 at 11:32:13 am.

In various embodiments, the facility makes various uses of the information in the attribution table. In some embodiments, the facility summarizes the information in the attribution table to generate information resources usable by advertisers and such other representatives to appreciate and/or visualize the impact of other types of advertising on their search advertising results. In some such embodiments, the facility aggregates the contents of the attribution table in such a way as to compare the impact of other kinds of advertising messages of different types (e.g., banner advertising messages, video advertising messages, animation advertising messages, audio advertising messages, etc.; different subjects, themes, or techniques of the other advertising messages; etc. In some embodiments, the facility analyzes the contents of the attribution table and makes recommendations about adjusting aspects of the placement of advertising messages of other types in order to maximize their positive impact on search advertising results. In some embodiments, based on such analysis, the facility automatically adjusts aspects of placements of advertising messages of other types in order to maximize their impact on search advertising message results.

In the above description, information about the presentation of advertising messages of types other than search advertising messages to a user for a particular cause are stored in a client-side cookie. In various embodiments, the facility uses a variety of other approaches to storing this information. In some such embodiments, the facility uses different techniques to store this information on the client, such as JavaScript caching, Flash cookies or other related techniques. In some such embodiments, the facility stores this information on a server in connection with the user's attribution client identifier. This attribution client identifier is stored on the client and passed up to the attribution server using the available technique for client-side storage. In some embodiments, the same attribution client identifier is stored on a number of different devices all used by the same user as a basis for tracking advertising messages presented to the user across this group of devices. In some embodiments, different devices used by the user have different attribution client identifiers that are all mapped to the same user via an attribution client identifier mapping table, again to facilitate the tracking of the user across this group of devices.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method performed by a computing system for analyzing electronic advertising, the method comprising:
    receiving a notification of activation of a search advertising message by a client device,
        wherein the search advertising message is presented on a search results webpage displayed on the client device in response to a search query input by a user of the client device,
        wherein the notification includes a URL for a landing page associated with the search advertising message, and
        wherein the activation of the search advertising message on the client device causes display of the landing page as indicated by the URL;
    in response to receiving the notification of the activation of the search advertising message,
        accessing records of advertising messages that were presented on the client device before presentation of the search advertising message on the client device,
            wherein the advertising messages are of different types including a banner advertising message, a video advertising message, an animation advertising message, or an audio advertising message,
            wherein a type of advertising message is selected for presentation on the client device in a particular instance of a particular webpage based on contextual data including:
                a subject of the particular webpage,
                a website of the particular webpage,
                a section of the website of the webpage,
                demographic information about the user, or
                web browsing behavior of the user, and
            wherein each record of an advertising message is associated with a target URL for a target landing page such that activation of the advertising message would cause the client device to present the target landing page as indicated by the target URL;
        identifying a plurality of advertising messages, from among those associated with the records of advertising messages, whose target URLs match the URL of the search advertising message;
        measuring an effect of each type of the identified advertising messages, presented on the client device before presentation of the search advertising message, to cause activation of the search advertising message by the user; and
        recording an indication that activation of the search advertising message should be at least partly attributed to presentation of at least one of the identified advertising messages of a particular type and the measured effect of the particular type relative to other types of the identified advertising messages.

2. The method of claim 1 wherein the plurality of advertising messages include one or more types of advertising messages different than search advertising messages.

3. The method of claim 1 wherein the plurality of advertising messages include display advertising messages.

4. The method of claim 1 wherein the plurality of advertising messages include search advertising messages.

5. The method of claim 1 wherein the notification includes a user identifier and wherein the notification is received from a client device with which the user identifier of the notification is associated.

6. The method of claim 1 wherein the notification is an HTTP request, the method further comprising:
    responding to the notification with a redirect command identifying the landing page of the search advertising message.

7. The method of claim 1 wherein the notification includes a cookie portion.

8. One or more instances of computer-readable media collectively storing contents configured to perform a method for analyzing electronic advertising, the method comprising:
    (a) determining that a client device has been used to present a first advertising message of a first type,
        wherein the first advertising message was presented on the client device in response to input by a user,
        wherein the first advertising message is associated with a first URL for a first landing page;
    (b) in response to (a),
        accessing records of advertising messages that were presented on the client device before presentation of the first advertising message on the client device,
            wherein the advertising messages are of different types including a banner advertising message, a video advertising message, an animation advertising message, or an audio advertising message,
            wherein a particular type of a particular advertising message is selected for presentation based on contextual data including:
                a subject of a webpage on which the particular advertising message is presented,
                a website of the webpage,
                a section of the website to which the webpage belongs,
                demographic information about the user, or
                web browsing behavior of the user, and
            wherein each record or an advertising message is associated with a target URL for a target landing page such that activation of the target URL causes presentation of the target landing page indicated by the target URL;
        identifying a second advertising message, from among those associated with the records of advertising messages, of a second type that has a second URL that matches the first URL for the first landing page; and
    (c) in response to (b),
        measuring a relative effect of the first type and the second type of the advertising messages presented on the client device before presentation of the first advertising message, to cause the activation the first URL by the user; and
        generating an indication that the activation of the first URL is at least partly attributable to the presentation of at least one of the advertising messages of the second type based on the measured effect.

9. The instances of computer-readable media of claim 8 wherein the first type of advertising messages and the second type of advertising messages are different types.

10. The instances of computer-readable media of claim 8 wherein the first type of advertising messages and the second type of advertising messages are the same type.

11. The instances of computer-readable media of claim 8, further comprising:
receiving a notification that the client device has been used to present the advertising message of the first type, the received notification indicating at least one advertising message of a third type that was presented on the client device at a time before the client device was used to present the advertising message of the first type, wherein (b) is performed using contents of the notification.

12. The instances of computer-readable media of claim 8, further comprising:
receiving a notification that the client device has been used to present the advertising message of the first type, the received notification containing a client identifier; and
using the client identifier contained in the received notification to retrieve from an information resource separate from the received notification indications of at least one advertising message of a third type that was presented on the client device at a time before the client device was used to activate the advertising message of the first type, wherein (b) is performed using the retrieved indications.

13. A method for analyzing electronic advertising, the method comprising:
(a) determining that a first advertising message of a first type has been activated in connection with a user identifier,
wherein the first advertising message is associated with a first URL for a first landing page, and
wherein activation of the first advertising message causes display of the first landing page indicated by the first URL;
(b) in response to (a),
accessing records of advertising messages that were presented at a device before presentation of the first advertising message,
wherein the advertising messages are of different types including a banner message, a video message, an animation message, or an audio message,
wherein a particular type of advertising message is selected for presentation on a particular webpage based on:
a subject of the particular webpage,
a website of the particular webpage,
a section of the website including the webpage,
demographic information about the user, or
web browsing behavior of the user, and
wherein each record of an advertising message is associated with a target URL for a target landing page such that activation of the advertising message causes presentation of the target landing page indicated by the target URL;
identifying a second advertising message, from among the records of advertising messages, of a second type that has a second target URL that matches the first URL of the first landing page for the first advertising message of the first type; and (c) in response to (b),
measuring an effect of the second type of the second advertising message on the user to activate the first URL for the first landing page, and
generating an indication that the activation of the first advertising message of the first type in connection with the user identifier is at least partly attributable to the presentation of the second advertising message of the second type based on the measured effect.

14. The method of claim 13 wherein activation of the first advertising message of the first type occurred on a client device, and presentation of the second advertising message of the second type also occurred on the client device.

15. The method of claim 13 wherein activation of the first advertising message of the first type occurred on a first client device, and presentation of the second advertising message of the second type occurred on a second client device distinct from the first client device.

16. One or more computer memories collectively storing an advertising attribution data structure, the data structure comprising a plurality of entries, each entry comprising:
an indication of a first advertising message of a first type activated from a client device at a first time,
wherein the first advertising message was presented on the client device in response to input by a user of the client device,
wherein the indication includes a first target URL for a first target landing page associated with the first advertising message, and
wherein activation of the first advertising message on the client device causes display of the first target landing page indicated by the first target URL;
an indication of multiple records of advertising messages presented on the client device before presentation of the first advertising message of the first type on the client device,
wherein the advertising messages include the first type and a second type different from the first type,
wherein a particular type of advertising message is selected for presentation on a particular webpage based on contextual data of the particular webpage or the user of the client device, and
wherein each record of a particular advertising message is associated with a particular target URL for a particular target landing page;
for the first advertising message of the first type activated from the client device at the first time:
an indication of a second advertising message, from among the records of advertising messages, of the second type that was presented on the client device before the presentation of the first advertising message of the first type on the client device, and
an indication of a second target URL usable to retrieve a second landing page for the second advertising message of the second type,
wherein the second target URL matches the first target URL usable to retrieve the first target landing page for the first advertising message of the first type such that contents of the data structure are adapted for use to evaluate an effect that presenting advertising messages of the second type has had on activation of advertising messages of the first type.

17. The computer memories of claim 16 wherein advertising messages of the first type are search advertising messages.

18. The computer memories of claim 16 wherein advertising messages of the second type are display advertising messages.

19. The computer memories of claim 16 wherein each entry further comprises information identifying the client device.

20. The computer memories of claim 16 wherein, in each entry, the indication of the advertising message of the second type comprises information identifying the advertising message of the second type.

21. The computer memories of claim 16 wherein, in each entry, the indication of the advertising message of the second type comprises information identifying the second type of advertising message.

22. The computer memories of claim 16 wherein, in each entry, the indication of the advertising message of the second type comprises information identifying a date on which the advertising message of the second type was presented on the client device.

23. The computer memories of claim 16 wherein, in each entry, the indication of the advertising message of the second type comprises information identifying a time on which the advertising message of the second type was presented on the client device.

24. The computer memories of claim 16 wherein each entry further comprises information identifying a date on which the advertising message of the first type was activated from the client device.

25. The computer memories of claim 16 wherein each entry further comprises information identifying a time at which the advertising message of the first type was activated from the client device.

26. The computer memories of claim 16 wherein at least one entry further comprises an indication of a plurality of advertising messages of the second type that were presented on the client device at times all earlier than the first time.

27. The method of claim 1, wherein identifying the plurality of advertising messages that were presented on the client device before presentation of the activated search advertising message and whose landing page URL matches the landing page URL for the activated search advertising message comprises:
　for each advertising message that was presented on the client device before presentation of the activated search advertising message,
　　determining whether the landing page URL for the advertising message that was presented on the client device before presentation of the activated search advertising message matches the landing page URL for the activated search advertising message.

28. The one or more instances of computer-readable media of claim 8 collectively storing contents configured to perform a method for analyzing electronic advertising, wherein the identifying comprises:
　identifying advertising messages of the second type that were presented on the client device before presentation of the advertising message of the first type; and
　for each identified advertising message of the second type,
　　determining whether the identified advertising message of the second type has a landing page URL that matches the landing page URL for the advertising message of the first type.

\* \* \* \* \*